United States Patent [19]

Ise et al.

[11] Patent Number: 4,700,348

[45] Date of Patent: Oct. 13, 1987

[54] HOT STANDBY COMMUNICATIONS SYSTEM

[75] Inventors: Taichiro Ise, Tokyo; Kazuyuki Yamamoto; Hiroyo Ogawa, both of Kanagawa, all of Japan

[73] Assignees: NEC Corporation; Nippon Telegraph and Telephone Corporation, both of Tokyo, Japan

[21] Appl. No.: 739,586

[22] Filed: May 30, 1985

[30] Foreign Application Priority Data

May 31, 1984 [JP] Japan ............ 59-111348

[51] Int. Cl.[4] ............ H04L 1/22; G06F 11/16

[52] U.S. Cl. ............ 371/8; 340/825.01; 455/8; 370/16

[58] Field of Search ............ 371/8, 9; 340/825.01; 455/8; 370/16; 179/175.35; 365/229; 364/200, 900, 187, 707

[56] References Cited

U.S. PATENT DOCUMENTS 3,305,791 2/1967 Wolfe ............ 371/8 X
3,451,042 6/1969 Jensen ............ 371/8
3,487,393 12/1969 Medlinski ............ 371/8
4,317,180 2/1982 Lies ............ 364/707
4,385,392 5/1983 Angell ............ 371/8 X
4,437,154 3/1984 Eisele ............ 364/187
4,570,219 2/1986 Shibukawa ............ 364/707 X

FOREIGN PATENT DOCUMENTS 2345489 3/1975 Fed. Rep. of Germany ............ 371/8
97749 6/1982 Japan ............ 371/8

*Primary Examiner*—Jerry Smith
*Assistant Examiner*—Robert W. Beausoliel, Jr.
*Attorney, Agent, or Firm*—Sughrue, Mion, Zinn, Macpeak & Seas

[57] ABSTRACT

A communications system of the type having a normal operating system and a back-up standby system includes a branching circuit which supplies an output signal at a high power and at a lower power, respectively. The high power signal is supplied to the system which is presently operating as the normal operating system. Controlled switching means are provided to direct the high power signal to the back-up system when the back-up system is to operate as the normal operating system, and to couple the output of the back-up system to the communications system output upon this occurrence.

8 Claims, 2 Drawing Figures

BRANCHING CIRCUIT
2
1
21
22
SWITCH
9
COMMUNICATION EQUIPMENT
4
COMMUNICATION EQUIPMENT
5
SWITCH
6
7
10
CONTROLLER
8

HOT STANDBY COMMUNICATIONS SYSTEM

BACKGROUND OF THE INVENTION

The present invention relates to a hot standby communications system for enhancing the reliability of microwave communications or the like.

Approaches heretofore proposed to promote reliable microwave communications include a hot standby communications system which uses regular equipment and back-up equipment. The system is arranged such that both the regular and back-up equipment systems are constantly ready to receive input power and, when the regular equipment fails, the back-up system replaces it to avoid service interruption.

In a hot standby communications system of the kind described, where a received input is applied to the regular equipment but not to the back-up equipment, it is difficult to detect failures which might occur in the back-up equipment and, therefore, to realize the higher reliability afforded by a parallel redundant construction. In light of this, a construction which feeds a part of a received input to the standby back-up equipment is often employed. This, as it solves the abovementioned problem in, brings about another problem that the received input applied to the regular equipment is cut down complementarily to the fraction which is applied to the back-up equipment, resulting in a deterioration in communications quality. For example, where a received input is divided into two equal parts so as to distribute one to the regular equipment and the other to the back-up equipment, power is undesirably reduced complementarily to lower the received input by 3 dB at both the regular and back-up systems.

The above situation may be coped with by first giving priority to the communications quality of the regular equipment at, as has also been proposed. Specifically, the improvement is achievable by splitting the received input into signals having two different values of powers, and routing the greater one of them to the regular equipment and the smaller one to the back-up. This prior art branching scheme, however, cannot avoid the drawback that once the initial regular equipment fails, the greater power distributed thereto translates into a greater fall in the communications quality of the back-up equipment which continues until the former is repaired.

SUMMARY OF THE INVENTION

It is therefore an object of the present invention to provide a hot standby communications system which has a simple construction and, yet, allows a minimum of deterioration to occur in communications quality despite the distribution of a power to a back-up standby.

In order to achieve the above object, the hot standby communications system of the present invention includes switching means interposed between two communication systems to branch a received input into signals having two different powers. That one of the signals which is greater in power than the other is routed to that one of the communications systems which is to be used as the regular system without regard to whether this system has initially been used as the regular system or not. The other or smaller-power signal is routed to the other communications equipment which is to be used as the back-up, without regard to whether it was initially the back-up system or not.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
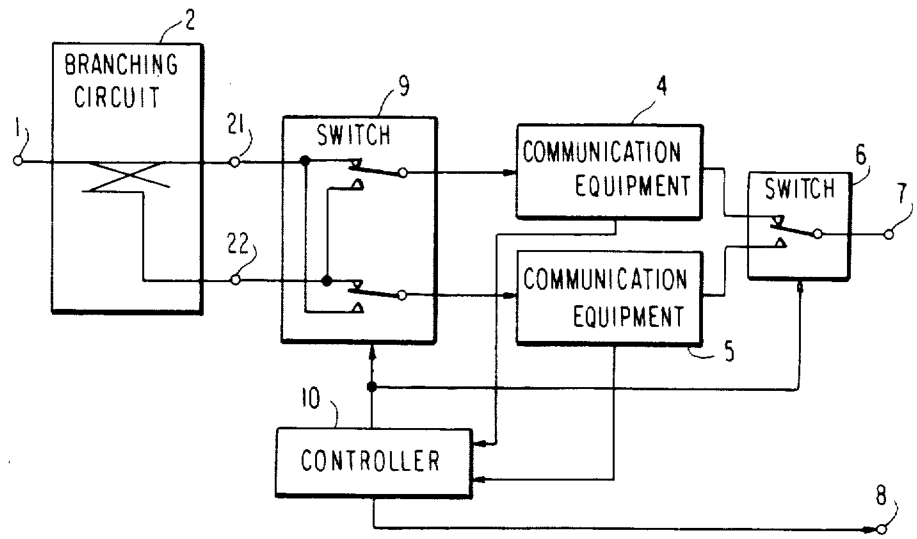
FIG. 1 is a block diagram of a hot standby communications system embodying the present invention.

Referring to FIG. 1 of the drawings, the hot standby communications system in accordance with the present invention is shown in a block diagram. The system comprises an input terminal 1, a branching circuit 2, communications systems 4 and 5, a switch 6, an output terminal 7, an alarm output terminal 8, a switch 9 and a controller 10.

In FIG. 1, the received input power coming in through the input terminal 1 is applied to the branching circuit 2 to be divided thereby into two signals having different powers. The two signals appear respectively at output terminals 21 and 22 of the branching circuit 2. Comprised of a directional coupler or the like, the branching circuit 2 may produce at the output 21 a power which is, for example, substantially 0.5 dB lower than the received input, and at the output 22 a power which is substantially 10 dB lower than the same. Naturally, some branching loss is unavoidable due to resistance losses and other factors within the branching circuit 2, so that the sum of the outputs of the branching circuit 2 is somewhat smaller than the received input.

The branched outputs at the terminals 21 and 22 are applied to the switch 9 to be thereby constantly distributed to the equipment 4 and 5. Concerning the switch 9, use may be made of a semiconductor switch, a waveguide switch or any other suitable switch so long as it matches the specific frequency band of the received power, allowable transition loss, etc. The controller 10 is adapted to control the switches 9 and 6 and to produce an alarm at the alarm output terminal 8, in response to the notification of a failure, which may be sent to the controller 10 from the equipment 4 or 5.

In the communications system shown and described, it is assumed that the equipment 4 is designated for regular service and the equipment 5 for back-up service at the start of operation. Then, the controller 10 controls the switch 9 such that the greater power output terminal 21 of the branching circuit 2 is coupled to the regular equipment 4 and the smaller power output terminal 22 to the back-up equipment 5. At the same time, the controller 10 actuates the switch 6 to couple an output terminal of the regular equipment 4 to the output terminal 7 of the system.

As soon as the equipment 4 operating as the regular equipment fails, it notifies the controller 10 of the failure. Then, the controller 10 actuates the switch 9 to connect the greater power output terminal 21 to the equipment 5 which is to replace the equipment 4 for regular service, and the smaller power output terminal 22 to the equipment 4 which is to become the back-up. Simultaneously, the controller 10 controls the switch 6 to couple an output terminal of the alternative regular equipment 5 to the output terminal 7. Before or after this, the controller 10 produces an alarm at the alarm output terminal 8 in order to inform maintenance personnel of the failure of the equipment 4. The maintenance personnel will then repair the equipment 4 which is the back-up at this time.

If the back-up equipment 5 fails before the original regular equipment 4, the controller 10 produces an alarm at the alarm output terminal 8 and does not actuate the switch 9 or the switch 6. The alarm will alert the maintenance personnel to repair the transceiver 5 which will then be the standby.

The systems 4 and 5 may each consist of a transmitter and a receiver or a certain part of a communications system such as a receiving section, an intermediate frequency section, a transmitting section, a decoding section or a demodulating section.

The embodiment described above is constructed on the assumption that a failure in any of the communications equipment will be promptly repaired. In addition, it identifies only the normally operating and failing statuses of each system and not an intermediate status, allowing some degree of fall in communications quality to develop without a failure indication. However, the present invention is also applicable to the case wherein the communications equipment is not designed for field repairs and an intermediate status occurs because of characteristics which gradually decay due to aging or the like or temporarily decline due to changes in temperature and other ambient conditions, a situation typically encountered with a satellite transponder.

Figure 2:
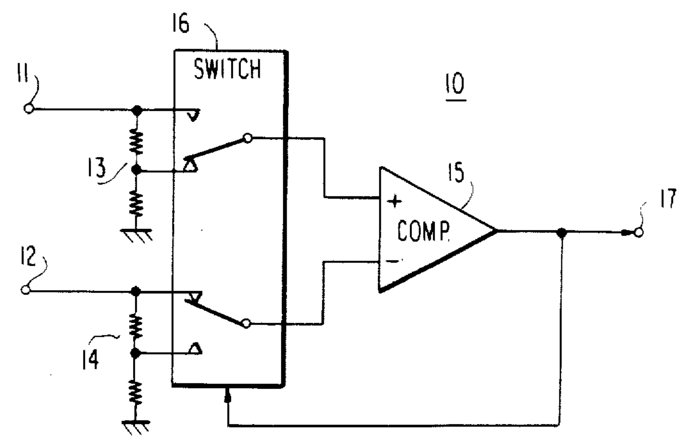
FIG. 2 is a block diagram showing a specific example of a controller 10 included in the system of FIG. 1.

Referring to FIG. 2, a specific construction of the controller 10 which is effective for use in the above-described situation is shown in a block diagram. As shown, the controller 10 has a pair of input terminals 11 and 12 to which dc voltages proportional to the outputs of the communication systems 4 and 5 of FIG. 1 (assumed to be FM receivers 4 and 5 in this particular example) respectively are applied. The dc voltage applied to the input terminal 11 is divided by a voltage divider 13, and the dc voltage applied to the input terminal 12 by a voltage divider 14. Output terminals of the voltage dividers 13 and 14 are selectively coupled to input terminals of a comparator 15 by a switch 16.

As described above, dc voltages proportional to outputs of the receivers 4 and 5 (e.g. pilot signals, noise and the like from the demodulators of the receivers) are respectively applied to the input terminals 11 and 12. It follows that so long as the outputs of the respective receivers are not saturated, power proportional to the power received by the receivers 4 and 5 respectively appears at the input terminals 11 and 12. Hence, assuming that the receiver 4 is operating for regular service and that the gains of the receivers 4 and 5 are the same, the voltage appearing at the input terminal 11 will be higher than the one appearing at the input terminal 12 by the division ratio assigned to the branching circuit 2. The voltage dividers 13 and 14 are adapted to provide a voltage division ratio which is equal to such a division ratio. The switch 16 couples the voltage applied to the input terminal 11 and divided by the voltage divider 13 to a non-inverting input of the comparator 15, while directly coupling the voltage applied to the input terminal 12 to an inverting input of the comparator 15.

Since the voltage division ratio assigned to the voltage dividers 13 and 14 is selected to be equal to the power branching ratio assigned to the branching circuit 2 as mentioned above, the two inputs to the comparator 15 will be equal if the gains of the receivers 4 and 5 are the same. The comparator 15 is provided with a hysteresis characteristic adequate for stable operation so that the output appearing at an output terminal 17 is at a high level when the two inputs are equal. The high level signal controls the switch 16 inside the controller 10 as well as the switches 9 and 6 (FIG. 1).

Assuming that a distinct failure has occurred in the receiver 4 due to the separation of a soldered part, the opening or shorting of a semiconductor element or any other cause, the input voltage to the non-inverting input of the comparator 15 is reduced to zero. Then, the output of the comparator 15 assumes a low level to actuate the switches 9 and 6 (FIG. 1) and the switch 16 of the controller 10.

Alternatively, when the gain of the receiver 4 operating as the regular receiver has been reduced due to aging to a value far below that of the receiver 5, the output of the comparator 15 changes from the high level to the low level to actuate the switches 9 and 6 (FIG. 1) and the switch 16 of the controller 10. This causes the receiver 5 to start operating as the regular receiver in place of the receiver 4. Thereafter, while the rate of the gain decrease of the receiver 4 due to aging decreases, that of the gain of the receiver 5 continues slowly but steadily. As the gain of the receiver 5 decreases to far below that of the receiver 4 for the above or any other reason, the output of the comparator 15 is restored to the high level to substitute the receiver 4 for the receiver 5 as the regular receiver.

It may occur that the receiver 4 is higher in gain than the receiver 5 in a relatively high temperature range and the latter is higher than the the former in a relatively low temperature range, due to the different temperature characteristics of those constituents of the receivers 4 and 5 which are relatively susceptive to ambient temperature. In this case, the receiver 4 will serve as the regular receiver upon an elevation in the ambient temperature and the receiver 5 will so operate upon a drop in the same. Such a difference in temperature characteristic may intentionally be employed in order to achieve both reliability of operation and an improvement in the temperature characteristic as a whole.

It may also occur that the functions of the individual receivers 4 and 5 are affected by, for example, incomplete contact developed within the receivers 4 and 5. Such, however, does not interrupt the communication unless occurring in both receivers at the same time.

While the illustrative embodiment has focused upon a construction wherein the regular and back-up systems are switched based on the relation between their gains, such is not restrictive and only illustrative. Alternatively, a suitable parameter which reflects communications quality which in turn is unconditionally related to input levels such as signal-to-noise (S/N) ratios and bit error rates (in the case of digital signal communications) may be converted to a voltage and, then, applied to each of the input terminals 11 and 12. This, as in the case with the gain, allows the regular and back-up systems to be adequately selected in such a manner as to provide higher communications quality.

The specific controller construction shown in FIG. 2 is applicable to a communications apparatus of the kind which assumes repair upon failure. For example, assuming that a system is regarded to have failed when its gain has lowered a predetermined amount from the initial setting and this is followed by repairs, that one of the two systems whose decrease in gain is less than the other can be selected to serve in regular use until the other decreases its gain by the predetermined amount. This maintains the gain decrease of the regular equipment just before repair less than the predetermined value, correspondingly enhancing communications quality.

In summary, it will be seen that the present invention provides a hot standby communications system which minimizes the fall in communications quality due to the supply of power to a standby back-up system both before and after the occurrence of a failure. This advantage derives from the unique construction wherein the present regular equipment is constantly supplied with greater-powered one of two branched signals.

In addition, since the controller 10 shown in FIG. 1 is common to that which has been installed as an essential element in prior art hot standby communications systems, the switch 9 is the only element which has to be added to practice the present invention. Such does not add to the intricacy of construction or the costs.

What is claimed is:

1. A standby communications system of the type having two communication systems denoted as a regular system and a backup system, comprising:

branching means for branching an input signal into two signals having high and low powers, respectively;

switching means responsive to a control signal for connecting a first output terminal of said branching means, at which the signal having the greater power appears, to an input terminal of that one of the communication systems which is to be used as the regular system, and connecting a second output terminal of said branching means, at which the signal having the smaller power appears, to an input terminal of the other communication system which is to be used as the back-up system; and control means responsive to the outputs of the regular system and the back-up system for providing said control signal.

2. A system as claimed in claim 1, wherein said control means receives an input from each of said communication systems, and includes means for balancing said inputs to obtain balanced output signals of normally equal levels, comparator means for comparing said balanced output signals, and an output of said comparator means being coupled back to said balancing means.

3. A system as claimed in claim 2, wherein said balancing means comprises voltage divider means coupled to each of said inputs, and ganged switch means operating in response to said output of said comparator means to selectively make or break contact between selected ones of plural taps of said voltage divider means and outputs of said balancing means.

4. A system as claimed in claim 3, wherein said ganged switch means include a first switch normally connected to a center tap of a first of said voltage divider means, and a second switch normally connected to a high voltage tap of a second of said voltage divider means, said first and second switches operating in response to said output of said comparator means so as to switch said first switch from said center tap to a high voltage tap of said first voltage divider means, and so as to switch said second switch from said high level voltage tap to a center tap of said second voltage divider means.

5. A system as claimed in claim 2, wherein said output of said comparator means comprises said control signal.

6. A system as claimed in claim 1, wherein said control means includes comparator means for comparing weighted outputs of said two communication systems, and which produces said control signal upon a failure of the communication system then operating as the regular system.

7. A system as claimed in claim 6, wherein said switching means comprises a pair of switching elements arranged for simultaneous operation, a first of said switching elements being normally connected to said first output terminal of said branching means, and a second of said switching elements being normally connected to said second output terminal of said branching means, said first and second switching elements being operated in response to said control signal to respectively connect terminals thereof to said second output terminal of said branching means and said first output terminal of said branching means.

8. A system as claimed in claim 1, further comprising output switching means operating in response to said control signal for connecting an output of the then regular system to an output of said stand-by communications system.

* * * * *

UNITED STATES PATENT AND TRADEMARK OFFICE

CERTIFICATE OF CORRECTION

PATENT NO. : 4,700,348

DATED : October 13, 1987

INVENTOR(S) : Taichiro Ise et al

It is certified that error appears in the above-identified patent and that said Letters Patent is hereby corrected as shown below:

Column 3, line 47, after "saturated," insert --dc--.

Signed and Sealed this

Fourteenth Day of June, 1988

*Attest:*

DONALD J. QUIGG

*Attesting Officer*

*Commissioner of Patents and Trademarks*